United States Patent [19]

Plotzker et al.

[11] Patent Number: 4,745,008
[45] Date of Patent: May 17, 1988

[54] PROCESS FOR CARBON-CARBON COMPOSITE FABRICATION

[75] Inventors: Irene G. Plotzker, Wilmington, Del.; Joan H. Cranmer, Cerritos, Calif.; Donald R. Uhlmann, Newton, Mass.; Leighton H. Peebles, Jr., Annandale, Va.

[73] Assignee: United States of America as represented by the Secretary of the Air Force, Washington, D.C.

[21] Appl. No.: 852,597

[22] Filed: Apr. 16, 1986

[51] Int. Cl.$^4$ .................. B05D 3/02; C01B 31/02
[52] U.S. Cl. .................. 427/228; 264/29.5; 264/29.7; 423/447.2; 423/447.4; 423/447.8
[58] Field of Search .................. 264/29.7, 29.5, 241; 423/447.4, 447.8, 447.2; 208/39; 427/227, 228

[56] References Cited

U.S. PATENT DOCUMENTS

| | | | |
|---|---|---|---|
| 3,366,724 | 1/1968 | Marincek | 264/29.7 |
| 4,005,183 | 1/1977 | Singer | 264/211.11 |
| 4,517,137 | 5/1985 | Schön | 264/29.7 |
| 4,525,337 | 6/1985 | Jamet et al. | 264/29.5 |
| 4,567,007 | 1/1986 | Harder | 264/29.5 |

Primary Examiner—Jan H. Silbaugh
Assistant Examiner—Hubert C. Lorin
Attorney, Agent, or Firm—William G. Auton; Donald J. Singer

[57] ABSTRACT

A fabrication process is disclosed that achieves a higher density carbon-carbon article, than the prior art processes by maintaining a vertical temperature gradient in a reservoir of pitch (e.g. 550° C. at the bottom to 250° C. at the top) into which a carbon fiber preform is immersed. The use of the vertical temperature gradient results in a reservoir of hot fluid pitch around the upper end of the preform during pitch impregnation of the preform. This permits the fluid pitch to drain down by gravity into the interstices of the carbon fiber and the hardening pitch below. The next step of the process involves gradually increasing the pitch-hardening temperature from bottom to top to harden the pitch from bottom to top. Thereafter, the impregnated preform is carbonized at high temperature. This method takes advantage of the thermal conductivity of the carbon fibers and does not require extremely high pressures. In fact, a high pressure would be a detriment since it results in closed pores. The process of the present disclosure depends on the development of large, connected pores that can be more easily filled. This manner results in the production of suitable carbonized billets in a fraction of the time currently required and using much less energy.

8 Claims, 2 Drawing Sheets

4,745,008

PROCESS FOR CARBON-CARBON COMPOSITE FABRICATION

STATEMENT OF GOVERNMENT INTEREST

The invention described herein may be manufactured and used by or for the Government for governmental purposes without the payment of any royalty thereon.

BACKGROUND OF THE INVENTION

The present invention relates to a fabrication process that produces dense carbonized carbon-carbon composites.

Recent advances in the field of aerospace technology have created a need for high strength, temperature resistant materials that possess the necessary properties needed to protect rocket combustion chambers and re-entry vehicles from the severe temperatures encountered within their environment. Re-entry vehicles are especially vulnerable to the stress and strain induced by their re-entry environment and require shapestable external surfaces capable of surviving those stresses. Existing carbon-carbon materials have proven somewhat effective as materials for application to re-entry vehicles and show adequate thermal stress performance. Carbon-carbon composites are being used for all three rocket nozzle stages of the MX missile. Carbon-carbon composites are being considered by the United States Air Force for use as manrated engine or cruise missile engine structures. Their ability to withstand 3500° F. offers the promise and potential of extending range by 75% by the same amount of fuel, but limited to temperatures of less than 2500° F. Finally, carbon-carbon composites are being considered for use as primary structures for large space stations and satellites.

The task of fabricating carbon-carbon composites is alleviated, to some degree, by the prior art techniques contained in the following U.S. patents:

U.S. Pat. No. 4,032,607 issued to Schultz on 28 June 1977;

U.S. Pat. No. 4,201,611 issued to Stover on 6 May 1980; and

U.S. Pat. No. 4,234,650 issued to Schieber on 18 November 1980.

The Schultz and Stover patents, incorporated herein by reference, are typical of the prior art which discloses impregnating a carbon fiber web with pitch by attempting to drive fluid pitch into the interstices of the web by high pressure, e.g. 15,000 psi, heating the impregnated web to harden the pitch and thereafter carbonizing the web at a temperature above 2000° C.

The prior art methods of producing carbon-carbon composites involves impregnation of a reinforcing fiber array with pitch under pressure and then heating combination from outside. Although an applied pressure shifts pyrolysis equilibria so that a higher carbon yield is obtained, enough mass is still lost so that several impregnation and densification cycles are needed to produce material of suitably low porosity, and high density. While pressures of about 1000 psi result in reasonably open porosity, the higher pressures used in most prior art methods (e.g., 15,000 psi) produce a composite in which the pores tend to be closed, thus unfillable.

The Schieber patent, incorporated herein by reference, discloses a process of impregnating a carbon fiber felt at amospheric pressure with a fluid, carbonizable resin, i.e. phenol-formaldahyde resin, and then hardening the resin. Schieber then repeats this procedure on the same felt so that the density of the article increases.

Most of the prior art techniques follow the examples of Schultz and Stover. They provide a processing method involving several cycles of impregnation and carbonization densification under high autoclave pressure. This is very expensive and involves low yield and acute quality control problems. As mentioned above, the high-pressure prior art techniques tend to produce a composite in which the pores are closed. These techniques are then repeated in a series of cycles to increase the density of the final article.

The technique of Schieber is a more delicate approach, involving impregnating carbon fiber felt with resin at atmosphereic pressure and then hardening the resin. However, Schieber's process also involves a series of cycles to increase the density of the articles.

From the foregoing discussion, it is apparent that there currently exists the need for a new process that produces a suitably dense minimally porous carbonized carbon-carbon composite in only one or two cycles from petroleum pitch, coal-tar pitch, fractions obtained from either pitch, or resin impregnants. The present invention is directed towards satisfying that need.

SUMMARY OF THE INVENTION

The present invention is a carbonization process and apparatus for fabricating carbon-carbon composites. This process produces dense carbonized carbon-carbon composites in only one or two cycles from petroleum pitch, coal-tar pitch or fractional combinations of petroleum pitch, coal tar pitch, and resin impregnation.

In the fabrication process, a vertical gradient is established across a preform surrounded by pitch. Then, by applying moderate pressure the pores in the hardened pitch are continuously filled in by fluid pitch. By gradually increasing the temperature at the cooler end of the gradient, all of the pitch on the immersed fibers is eventually transformed and hardened.

It is a principal object of the present invention to provide an improved fabrication process of carbon-carbon composites.

It is another object of the present invention to fabricate carbon-carbon composites in only one or two cycles.

It is another object of the present invention to fabricate carbon-carbon composites with reduced time, energy, and cost from the prior art methods.

These together with other objects, features and advantages of the invention will become more readily apparent from the following detailed description when taken in comjunction with the accompanying drawings wherein like elements are given reference numerals.

DETAILED DESCRIPTION OF THE PREFERRED EMBODIMENT

The present invention is a carbonization process and apparatus for fabricating carbon-carbon composites. This process is an improvement over the prior art methods since it completes the fabrication in only one or two cycles.

The first obstacle encountered by all carbonization processes is the problem of maintaining a sufficient density of the final product. This is because the carbonization process is a form of pyrolysis, which is the breaking down of complex materials into simpler units by heat. The reason it is so difficult to maintain a sufficient density is that in most pyrolysis processes, pores form which consequently reduce the density of the fabrication.

Most of the prior art methods of carbonization require extremely high pressures to form the carbon-carbon composites, as shown by the Schultz and Stover references. The use of extremely high pressures compounds the problem of maintaining the product density since it results in closed pores. For this reason, the prior art processes have been forced to repeat the carbonization process for multiple cycles in an effort to fill in these pores and keep the density of the product at a sufficient level.

The fabrication process of the present invention takes advantage of the thermal conductivity of carbon fibers and does not use high pressures. The result of the successful use of low pressures is the presence of large, connected pores that are more easily filled. Therefore, the fabrication of a product with sufficient density can be achieved in only one or two cycles. In this manner it is possible to produce suitable carbonized billets in a fraction of the time currently required using much less energy.

Figure 1:
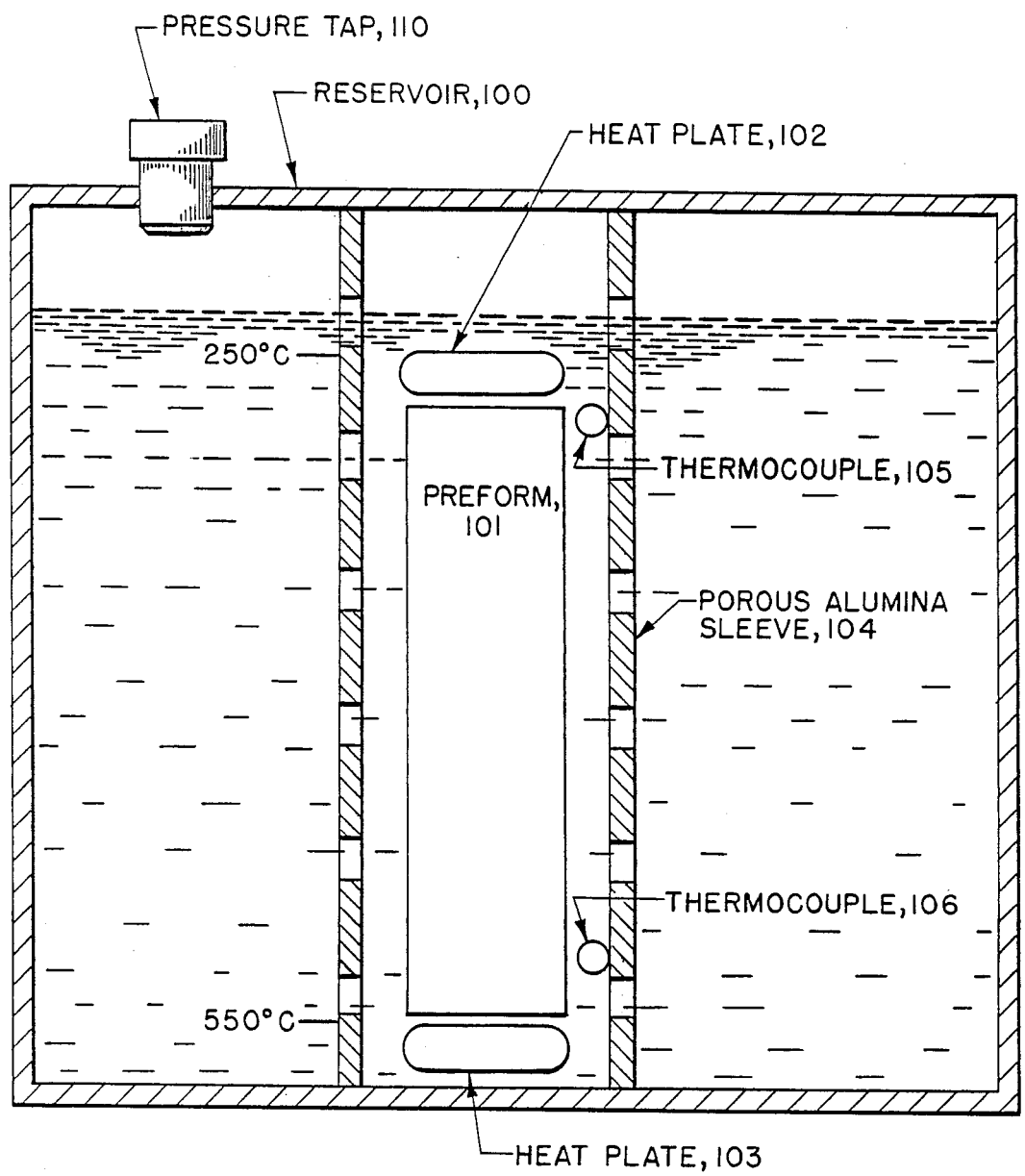
FIG. 1 is a block diagram of one embodiment of the apparatus of the present invention.

FIG. 1 is a block diagram of the apparatus of the present invention. The first step of the fabrication process is to immerse a carbon fiber preform 101 in a reservoir of pitch 100. The preform is composed of an array of carbon fibers such as pitch-based graphite fiber felt or any of the other preform compositions known in the art. The word "pitch" is used to denote any coal-tar pitch, petroleum pitch, a combination of fractions of either pitch or resin imprenants used in the art.

Next, inside the reservoir of pitch a temperature gradient is established vertically across the preform surrounded by the pitch. In the embodiment of FIG. 1, the temperature at the lower portion of the preform is hot (550° C.) while the temperature at the top is cooler (250° C.) so that the pitch remains fluid. In this manner the fluid pitch is capable of filling in the pores created by the pitch-hardening temperatures. These pitch hardening temperatures (550°) are known in the art as temperatures which cause the pitch to undergo pyrolysis, and chemically decompose into a mesophase state. An excellent summary of pitch characteristics is contained in the U.S. Pat. No. 4,525,337 issued to Jamet et al. which teaches that pitch has "a softening point of approximately 70° to 400° C. Beyond this level they liquefy and remain stable up to approximately 350° to 400° C., as from which they start to decompose with the release of hydrogen and volatile saturated hydrocarbons, whilst a mesophase forms in the liquid mass. The latter is in the form of small spheres similar to liquid crystals, which increase in size and which, by coalescences, invade the entire liquid phase." In the presence of a preform, pitch heated to these hardening temperatures undergoes what is known in the art as "densification" as the pitch chemically decomposes by pyrolysis into carbon, and hardens on the preform. Also note that it is the upper portion of the preform that has the cooler temperature and the fluid pitch. This permits the fluid pitch to drain down by gravity into the interstices of the carbon fiber and hardening pitch below.

As shown in FIG. 1, the vertical temperature gradient is established using two heat plates 102 and 103, and two thermocouples 105 and 106. The two thermocouples are used to monitor the pitch temperature as the vertical temperature gradient is established by having the lower heat plate 103 produce more heat than the upper heat plate 102.

The heat plates 102 and 103 of FIG. 1 are shown as being in contact with the preform 101. The heat plates of this embodiment are actually heating elements, known in the art, which generate heat when an electrical current is passed through them. In an alternate embodiment, the vertical temperature embodiment is generated by passing an electric current through the preform itself and using the resistive properties of the carbon fibers to generate heat.

In the embodiment of FIG. 1, a porous alumina sleeve 104 has been added to minimize the convection of fluid pitch and to help keep the pitch at the bottom of the preform 101 at a higher temperature than the pitch at the top of the preform. This sleeve should have a diameter slightly larger than the width of the preform, and have a sufficient porosity to allow pitch to continuously seep into the preform from the reservoir. Although the sleeve 104 may be unnecessary when the width of the preform approaches that of the reservoir, smaller preforms need to be covered to maintain the vertical temperature gradient.

During the fiber impregnation and pitch-hardening process the only moderate pressures are applied through the pressure tap 110 so that the pores in the hardened pitch are continously filled in by fluid pitch. Early trials were carried out in a crude apparatus at atmospheric pressure. Ashland 240 pitch was used, and the "preform" was a strip of pitch-based graphite fiber felt with the following dimensions: $1-1\frac{1}{4}'' \times 4\frac{3}{8}'' \times \frac{3}{8}''$, with thermocouples embedded in the felt at heights of $\frac{3}{8}''$, $2\frac{1}{8}''$, and $4''$. Additional thermocouples were used to monitor the temperatures of the two heat sources (hot plates). The container was a metal can ($5\frac{1}{2}''$ high, $4''$ in diameter). Can and contents were flushed with nitrogen after the pitch had melted. A suitably large temperature gradient would not develop across the sample unless it was somewhat insulated from the pitch bath. This was accomplished by wiring in place around the sample an alumina tube that was split lengthwise (to ease later removal) and drilled full of holes to allow pitch to seep into the preform from the bath. Additional pitch from a separate reservoir could also be added during a run.

As mentioned above, the fabrication process in the embodiment of FIG. 1 of the present invention is completed by gradually increasing the temperature at the cooler end of the gradient until all the pitch has been hardened and transformed. By maintaining the coolest temperatures at the upper end of the gradient, fluid pitch is permitted to drain down by gravity to continuously fill the pores of the hardened pitch of the entire carbonized billet. As a result only one or two cycles are needed to complete the fabrication process resulting in reduced production time, energy and cost.

Alternate methods of applying a thermal gradient to the billet, say by use of concentric heating elements at the base and the top of the billet, can also be used to effect simultaneous and continuous impregnation, transformation, and hardening of the carbonaceous impregnant. It is also feasible to apply the temperature gradient horizontally and move the preform in an "assembly-line" type production through the gradient.

Figure 2:
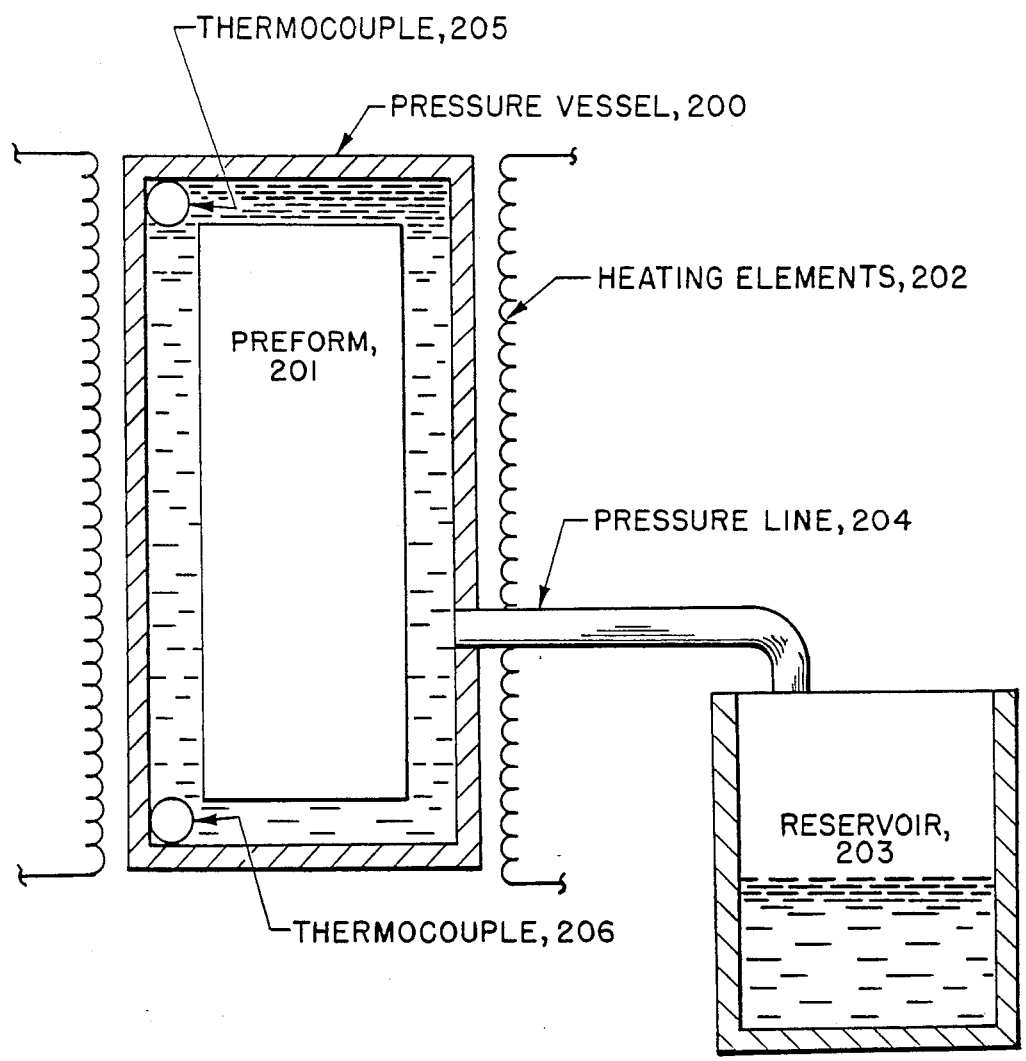
FIG. 2 is another block diagram of another embodiment of the present invention.

FIG. 2 is a block diagram of another embodiment of the present invention. In FIG. 2, the preform 201 is placed in a pressure vessel 200 and supplied with pitch by a pressure line 204 from a reservoir 203, which serves only as a supply of pitch.

External heating elements 202 then heat the pressure vessel 300 to apply the vertical temperature gradient of 250° C. near the top of the vessel 200, and 550° C. near the bottom of the vessel.

Two thermocouples 205 and 206, or some other temperature monitoring means, allow the user to monitor the temperature of the pressure vessel 200 and control the carbonization process. As the pitch begins to harden on the preform, the mid and upper portions of the pressure vessel are heated to about 550° C. as the pressure line 203 continuously supplies pitch to the pressure vessel 200 at low pressures (about 1 atmosphere).

The embodiment of FIG. 2 gradually increases temperatures at the cooler end of the vertical temperature gradient until all of the pitch has been transformed. Like the embodiment of FIG. 1, the embodiment of FIG. 2 maintains the coolest temperatures at the upper end of the gradient so that fluid pitch can drain down by gravity to continuously fill the pores of the hardened pitch. However, it is not mandatory that the coolest end be at the upper portion of the temperature gradient or that the temperature gradient be vertically established. The pressure line 204 of FIG. 2 is capable of supplying fluid pitch if the upper end of the pressure vessel 200 is the hottest portion of the temperature gradient. Additionally, the concentric and horizontal temperature gradient discussed earlier may also be applied in an apparatus similar to that of FIG. 2.

While the invention has been described in its presently preferred embodiment, it is understood that the words which have been used are words of description rather than words of limitation and that changes within the purview of the appended claims may be made without departing from the scope and spirit of the invention in its broader aspects.

What is claimed is:

1. A process of fabricating a carbonized billet using a preform and reservoir of pitch, said process comprising the steps of:

immersing said preform in said reservoir of pitch;
    establishing a temperature gradient across said preform, said temperature gradient having a cooler temperature at one extreme and a hot temperature at the other extreme, said cooler temperature being selected from a range of temperature in which said pitch remains fluid, said hot temperatures in which said pitch hardens by pyrolysis, wherein said temperature gradient comprises a vertical placement of a range of temperatures within said resevoir of pitch, said range of temperatures having said hot temperature at one extreme and said cooler temperature at the other extreme, and wherein said vertical placement of said range of temperatures includes having said cooler temperature at the upper end of said reservoir and said hot temperature at the lower end of said reservoir, said vertical placement of said range of temperature allowing fluid pitch to move by gravity to fill pores left in said preform by said hardening pitch;
    applying moderate pressures within said reservoir of pitch;
    gradually increasing the temperatures in said temperature gradient until all temperatures are within the range of temperatures in which said pitch hardens by pyrolysis, said gradually increasing the temperatures step having a delay which allows fluid pitch to fill pores in said preform left by hardening pitch; and
    removing said carbonized billet from said reservoir of pitch, said carbonized billet being formed as said pitch hardens on said preform.

2. A process of fabricating a carbonized billet as defined in claim 1 wherein said hot temperature comprises a temperature of about 550° C.

3. A process of fabricating a carbonized billet as defined in claim 2 wherein said cooler temperature comprises a temperature of about 250° C.

4. A process of fabricating a carbonized billet as defined in claim 3 wherein said moderate pressures comprise pressures of about one atmosphere.

5. A process of fabricating a carbonized billet as defined in claim 4 including a repeating step, said repeating step comprising a repetition of said immersing step, said establishing a temperature gradient step, said applying moderate pressures step, said gradual increasing the temperatures step and said removing step until said carbonized billet has satisfactory density.

6. A process of fabricating a carbonized billet as defined in claim 5, wherein said immersing step includes the placement of a porous sleeve over said preform in said reservoir of pitch, said porous sleeve serving to reduce any convection of pitch during said fabrication process so that said temperature gradient is more easily established and maintained.

7. A process of fabricating a carbonized billet as defined in claim 1 wherein said temperature gradient comprises a concentric placement of a range of temperatures within said reservoir of pitch, said range of temperatures having said hot temperature at one extreme and said cooler temperature at the other extreme.

8. A process of fabricating a carbonized billet using a preform and reservoir of pitch, said process comprising the steps of:

immersing said preform in said reservoir of pitch;
    establishing a temperature gradient across said preform, said gradient having a cooler temperature at one extreme and a hot temperature at the other extreme, said cooler temperature being selected from a range of temperatures in which said pitch remains fluid, said hot temperature being selected from a range of temperatures in which said pitch hardens by pyrolysis, wherein said temperature gradient comprises a horizontal placement of a range of temperatures within said reservoir of pitch, said range of temperatures having said hot temperature at one extreme and said cooler temperature at the other extreme;
    applying moderate pressures within said reservoir of pitch;
    gradually increasing the temperatures in said temperature gradient until all temperatures are within the range of temperatures in which said pitch hardens, said gradually increasing the temperatures step having a delay which allows fluid pitch to fill pores in said preform left by hardening pitch; and
    removing said carbonized billet from said reservoir of pitch, said carbonized billet being formed as said pitch hardens on said preform.

* * * * *